(No Model.)
S. H. ROBLIN.
HORSE DETACHER.
No. 398,977. Patented Mar. 5, 1889.
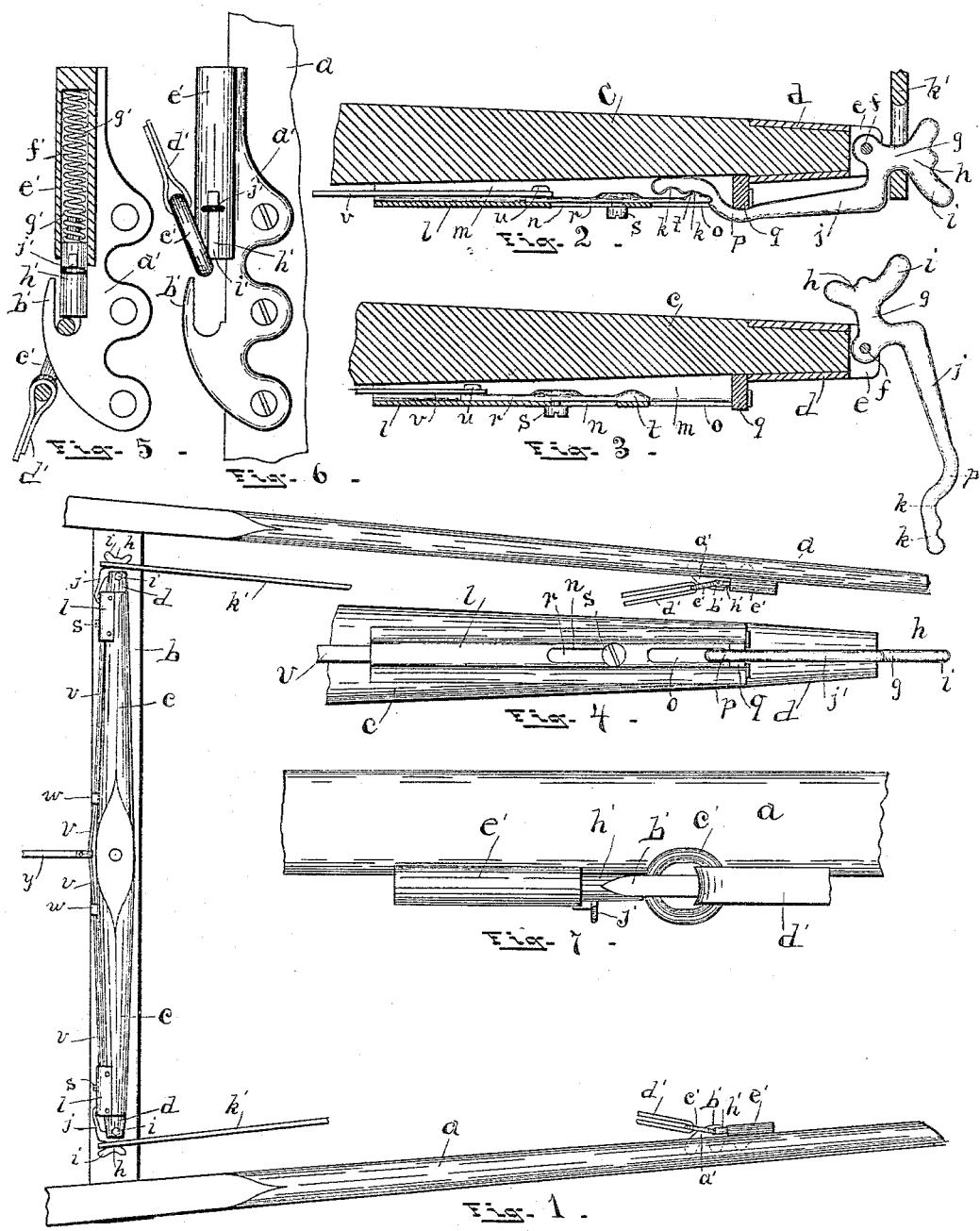
ATTEST:
W. H. Power
G. P. Thomas
INVENTOR:
Stephen H. Roblin
By Jas. E. Thomas, Atty.

UNITED STATES PATENT OFFICE.

STEPHEN HERBERT ROBLIN, OF BAY CITY, MICHIGAN, ASSIGNOR TO THE AMERICAN WHIFFLETREE COMPANY, OF SAME PLACE.

HORSE-DETACHER.

SPECIFICATION forming part of Letters Patent No. 398,977, dated March 5, 1889.

Application filed September 4, 1888. Serial No. 284,523. (No model.)

*To all whom it may concern:*

Be it known that I, STEPHEN HERBERT ROBLIN, a citizen of Canada, residing at Bay City, in the county of Bay and State of Michigan, have invented certain new and useful Improvements in Horse-Detaching Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in "horse-detaching devices," so called, or devices for attaching a horse to a vehicle by which, on the proper manipulation of the parts, the horse can quickly and easily be released from all connecting devices and allowed to pass free and clear from the vehicle; and the invention consists, essentially, in trace-attaching devices pivotally connected to the ends of the whiffletree and provided with inwardly-extending arms and suitable devices engaging with the said arms, whereby the said attaching devices are held in engagement with the traces, and suitable devices for releasing the said arms and allow the trace-holders to turn on their pivots, whereby the traces are allowed to pass from engagement therewith; and it further consists in forwardly-projecting hooks secured to the thills, suitable rings engaged with the hooks for attaching the holdback-straps thereto, and a retaining-piece provided with a spring for securing the hook in engagement with the said ring and to permit the rings to be disengaged from the hooks on being pulled forward, the whole being arranged to operate in combination to allow the horse, on the traces being detached from the whiffletree, to pass free from the thills and vehicle; and the invention also consists in the combination and arrangement of the several parts which are used in the construction of the devices, as I hereinafter more fully describe, and specifically set forth in the claims.

The objects of my invention are to provide an improved device whereby a horse or team may be quickly and easily detached and freed from a vehicle in case of a runaway or accident; and a second object of the invention is to provide devices by means of which all the parts attaching horses to vehicles may be released by one operation, whereby the necessity of passing from one side of the horse to the other to perform the operation is entirely avoided.

In the accompanying drawings are illustrated the devices with which I attain these objects, and in explanation of which Figure 1 is a top or plan view of a portion of a pair of thills and of the whiffletree and with my improved devices attached thereto. Fig. 2 is a horizontal central section of one end of a whiffletree and with the parts in position for securing the trace thereto. Fig. 3 is the same with the parts in position for releasing the trace. Fig. 4 is a rear view of Fig. 2. Fig. 5 is a view of the under side, and partly sectional, of the portion for securing the holdback-straps to the thills, and showing the parts in position before the traces are released. Fig. 6 is a similar view, and illustrates the position of the parts when the trace-straps are free and the horse is leaving the vehicle. Fig. 7 is a side view of the holdback attaching device shown in Fig. 5 and secured in position upon the thill.

Similar letters refer to similar parts throughout the several views.

$a$ represents vehicle-thills of any desired form, and $b$ is the cross-bar, to which is centrally pivoted the whiffletree $c$. The ends of the whiffletree are provided with ferrules $d$, which are illustrated in detail in Figs. 2, 3, and 4, and to which I now refer more particularly. The outer ends of the ferrules $d$ are provided with a horizontal slot, $e$, and in this slot is secured by a pivot, $f$, the shank $g$ of the tug-holder $h$, the outer end of the holder being provided on its rear side with an outwardly-curved portion, $i$, for retaining the tug in position on the shank, and $j$ is an arm which projects rearwardly from the pivoted point of the shank, and is then turned inwardly and extends for a short distance along the whiffletree, and is provided on its rear side with the depressions $k$.

$l$ is a cap or covering piece, which is secured by its inwardly-turned edges upon the under side of the whiffletree, leaving, however, a chamber or opening, m, beneath the piece and the whiffletree, and through the rear side of this cap l is provided the slot n near its middle, and also the slot o, which is cut through its outer end portion, and into which the free end of the arm j is passed, the arm being bent at p, so that the end of the arm which is within the slot will be below the cap-piece, and q is a spring, preferably of rubber and secured in position in the outer end of the chamber m to bear outwardly against the arm j.

r is a sliding catch or lock placed within the chamber m, and is held in position by a screw, s, which is passed through the slot n and into the lock-piece, the head of the screw reaching over the edges of the slot and retaining the lock-piece in position against the under side of the cap-piece, and the inner side of the outer end of the lock-piece is provided with a raised portion, t, which, when the arm j is in position within the slot o and the lock-piece is moved outwardly, passes over the end of the arm and engages with the depressions k thereon and firmly locks the arm in position, the locking-piece being moved into engagement by grasping the projecting head of the screw s.

Upon the inner end of the lock-piece is provided a hook, u, into which one end of a cord or strap, v, is engaged, the cord being passed through a loop, w, which is secured to the whiffletree near its central portion, and the opposite end of the whiffletree being provided with the same device, the opposite end of the cord v is secured to the opposite lock-piece and to the central portion of the cord, and between the loops w is secured one end of the operating cord or strap y, the opposite end of the cord y being passed into the vehicle and secured in a convenient position to be easily grasped by the driver.

As shown in detail in Figs. 5 and 6, a' is a metal piece secured in a suitable manner and location to the thill, and preferably to the under side thereof, as more convenient, and from the rear portion of this piece a', and upon the inner side thereof, is arranged a forwardly-extending hook, b', into which is caught a ring, c', the ring being also secured to the holdback-strap d', which extends forward from the breeching upon the horse in the ordinary way.

Upon the inner side of the front portion of the piece a' is provided a casing, e', inclosing a chamber, f', and within this chamber is placed a spring, g', and also a bolt, h', the bolt, however, reaching beyond the end of the chamber and within the space between the hook b' and the piece a', and is held by the spring with its outer end bearing against the ring c', which retains the ring in engagement with the hook, and by holding the ring closely against the hook prevents any noise or rattling thereof.

The under side of the casing e is provided with slot i', and j' is a stud projecting outwardly from the bolt h', with which to move the bolt within the chamber, the stud sliding in the slot i', which places the bolt in a position to permit the ring to be engaged with the hook b'.

As shown in Fig. 1, one of the devices thus described is secured to each thill, and it will be seen, of course, that so long as the holdback-straps are pulled backwardly the rings remain in engagement with the hooks; but on the straps being pulled forward the rings operating against the bolts h' cause them to recede within the chambers and beyond the ends of the hooks, and the rings are then free to pass from the hooks.

In practice the horse is secured to the vehicle in the ordinary way, the attaching parts of the tugs k being engaged with the tug-holders h, and the arms j being locked in position by the lock-pieces r, and the holdback-straps d' are attached to the thills by means of the rings c' and hooks d', as described, and all of the parts then operate the same as in the common form of attachments; but whenever it is necessary or desirable to detach the horse from the vehicle the operating-cord y is pulled by the driver to withdraw the lock-pieces r, the shanks g of the tug-holders then turn forwardly on their pivots, which allows the tugs to pass over the curved portions i, and the traces are then free, and the horse, still moving forward, draws the rings c' against the spring-bolts h', which, receding, allow the rings to pass from engagement with the hooks b' and the horse is free from the vehicle.

A very great advantage is gained by the use of my improved device, as the labor of detaching a horse from a vehicle under ordinary circumstances is greatly abbreviated and reduced, as the necessity of detaching one portion of the harness at a time and passing to and fro about the horse in the operation is entirely avoided, and it will be seen that in the case of a runaway, or upon the horse becoming fractious or unruly, the driver has only to pull the cord and the horse is freed from the vehicle without loss of time or trouble, and the liability of breaking or demolishing the vehicle or dangerously injuring the occupants thereof is entirely avoided.

My improvement is described herein as being applied to vehicles requiring but a single horse; but of course I wish it understood that it is as well adapted for use with a team of horses by applying the devices to each whiffletree.

Having described the construction and operation of my improvement, what I claim as my invention, and desire to secure by Letters Patent, is—

1. The combination, in a horse-detaching device, of the whiffletree having end ferrules, d, provided with the horizontal slots e, the tug-holders h, pivoted in said slots e and provided with the arms j, extending inwardly over the rear side of the whiffletree and having the depressions k and cap-pieces l, secured to the whiffletree and provided with the central slots, $n$, and the end slots, $o$, with the lock-pieces $r$ beneath the said cap-pieces, and with their outer ends passed over the free ends of the arms $j'$, the screws $s$, passed through the slots $n$ and into the lock-pieces, and the operating-cords $r$, secured to the inner ends of the lock-pieces, substantially as and for the purpose set forth.

2. In a horse-detaching device, the combination, with the thills and whiffletree provided with devices, as described, for securing the tugs thereto and for releasing the same, with holdback securing devices consisting of a base-plate secured to each thill and provided with hooks $b'$, projecting inwardly from their rear ends and extending forward, the rings $c'$, engaging with the hooks, and retaining-bolts $h'$ between the hooks and base-plates, and with one end bearing against the rings, and the springs $g'$, for holding the said retaining-bolts in position against the rings, substantially as and for the purpose set forth.

In testimony whereof I affix my signature in presence of two witnesses.

STEPHEN HERBERT ROBLIN.

Witnesses:
JAS. E. THOMAS,
GEORGE P. THOMAS.